United States Patent
Giri et al.

(10) Patent No.: US 12,532,141 B1
(45) Date of Patent: Jan. 20, 2026

(54) SET-BASED ACTIVE SPEAKER DETECTION

(71) Applicant: Amazon Technologies, Inc., Seattle, WA (US)

(72) Inventors: Ritwik Giri, Mountain View, CA (US); Michael Mark Goodwin, Scotts Valley, CA (US); Devansh Shah, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 379 days.

(21) Appl. No.: 18/187,619

(22) Filed: Mar. 21, 2023

(51) Int. Cl.
*H04S 7/00* (2006.01)
*H04R 1/40* (2006.01)
*H04R 3/12* (2006.01)

(52) U.S. Cl.
CPC ............. *H04S 7/303* (2013.01); *H04R 1/403* (2013.01); *H04R 3/12* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 2020/0075026 A1* | 3/2020 | Peeler | H04L 67/306 |
| 2020/0243094 A1* | 7/2020 | Thomson | G10L 15/28 |
| 2022/0172736 A1* | 6/2022 | Wexler | G06V 20/10 |
| 2023/0282224 A1* | 9/2023 | Chun | G10L 21/0232 |
| | | | 381/56 |
| 2023/0419962 A1* | 12/2023 | Kim | G10L 15/22 |
| 2024/0045574 A1* | 2/2024 | Nagpal | G06Q 10/1095 |
| 2024/0127820 A1* | 4/2024 | Salamon | G11B 27/031 |
| 2024/0185848 A1* | 6/2024 | Carbune | G06F 3/165 |
| 2024/0212689 A1* | 6/2024 | Mohammad | G10L 21/028 |

OTHER PUBLICATIONS

Ding et al., "Personal VAD: Speaker-Conditioned Voice Activity Detection", arXiv, Apr. 8, 2020, in 7 pages. Retrieved online: https://arxiv.org/pdf/1908.04284.pdf.

Ding et al., "Personal VAD 2.0: Optimizing Personal Voice Activity Detection for On-Device Speech Recognition", arXiv, Apr. 13, 2022, in 5 pages. Retrieved online: https://arxiv.org/pdf/2204.03793v2.pdf.

\* cited by examiner

*Primary Examiner* — Duc Nguyen
*Assistant Examiner* — Assad Mohammed
(74) *Attorney, Agent, or Firm* — Knobbe Martens Olson & Bear LLP

(57) ABSTRACT

A system may receive sound information and generate an inference embedding using the sound information. The system may additionally receive a set of speaker embeddings, which may represent voice information for a set of speakers. The system may compare the inference embedding to the set of speaker embeddings to generate a result. The system may determine, based on the result, a speaker identity match rating for each speaker embedding in the set of speaker embeddings. The system may identify a speaker associated with a speaker embedding of the set of speaker embeddings having the highest speaker identity match rating as an active speaker.

20 Claims, 7 Drawing Sheets

SET-BASED ACTIVE SPEAKER DETECTION

BACKGROUND

Communication systems can utilize computing devices to enable communication applications. In some implementations, a user of a first computing system will utilize the communication system to facilitate communicating with a user of a second computing system. When communicating, it may be desirable for the communication system, or a component of the communication system, to identify a currently speaking user. For example, where there is more than one user communicating, the first user may desire to distinguish whether the second user or a third user is currently speaking.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
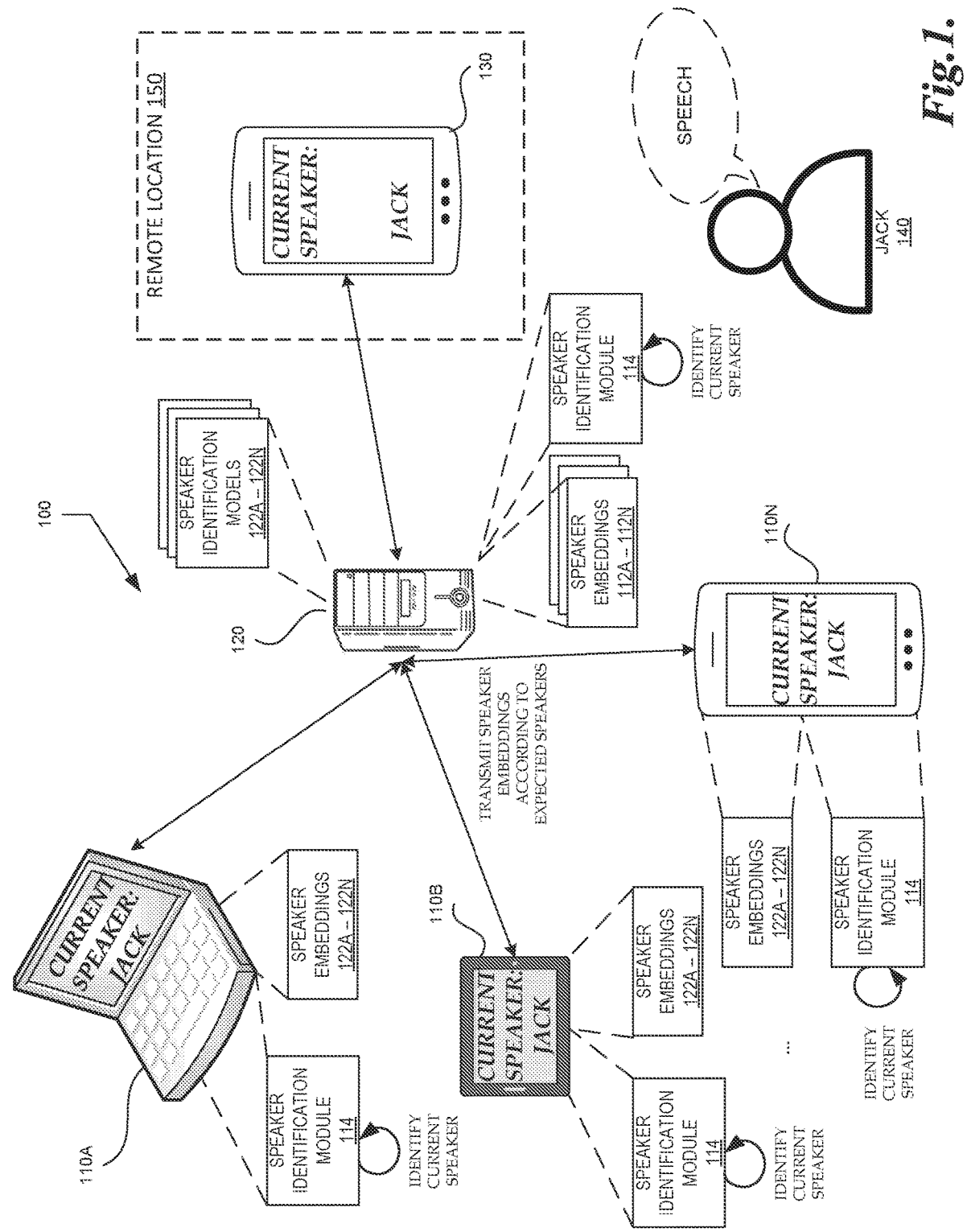
FIG. 1 is a diagram of illustrative data flows within an example system for set-based active speaker detection according to some embodiments.

The present disclosure relates to identifying an active speaker from among a set of potential speakers. The active speaker may be identified by comparing an encoded representation of audio in which the active speaker is to be identified to a set of encoded representations of audio known to be spoken by individuals who may be the active speaker.

Some conventional communication systems allow for automatic identification of an actively speaking participant, for example in a virtual meeting, and will indicate the actively speaking party for other participants. However, these systems often do not identify the individual speaking by recognizing the voice of the speaker. Rather, the speaker is identified based on a level of sound being received by that participant's microphone exceeding some threshold. Thus, at least two issues may arise. First, if the level of background noise received by a participant's microphone exceeds the threshold volume for identifying an individual as speaking, the communication system may mistakenly identify that participant as an active speaker. Second, while conventional communication systems may inform other participants that there is a speaker speaking into a microphone, the identity of the speaker is generally tied to the device detecting the speech or to an account thereof, rather than being dynamically determined based on the speech itself. Thus, where more than one participant shares a microphone, the system does not distinguish the individual speaker among the plurality of participants sharing the microphone. In some cases, the identity of the speaker is not provided at all by the communication system. The inability to identify an individual speaker may cause confusion among participants. Additionally, the inability to identify a speaker may make it difficult or impossible to generate a transcript assigning speech to participants, or to provide live captioning for participants unable to hear the speakers.

One possible technique for identifying an active speaker is to use a speaker identification model and recordings of a user's voice to generate an encoded representation (e.g., speaker embedding or other voiceprint) representing the user. The speaker identification model then produces sound embeddings for sound information from which the speaker is to be identified (e.g., real-time audio data). The encoded representation of the user is compared to the sound embeddings produced by the speaker identification model, and when the similarity between the encoded representation and the sound embedding is determined to be close enough, the user is identified as being the active speaker. The result is an identification of the user as actively speaking or not actively speaking. However, this technique can have drawbacks, including the inability to identify the active speaker from a set of potential speakers, instead only making a binary determination as to whether the one known speaker is currently speaking. Additionally, because this technique is directed to identification of a single active speaker, the ability to enroll a new speaker (e.g., generate a new embedding representing the new speaker) may be limited, as this technique does not allow for distinguishing between multiple speakers.

The present disclosure improves on the foregoing technique by utilizing a set of speaker embeddings, where each speaker embedding or subset of speaker embeddings represents a different potential speaker. Some techniques described herein use such a set of speaker embeddings to identify different speakers as an active speaker at different points in time. Some techniques described herein use such a set of speaker embeddings to identify multiple speakers as simultaneously-active speakers at the same point active speaker at a same point in time. To achieve the identification of an active speaker from the set of speaker embeddings, sound information may be processed by a model to generate an embedding for the sound information. The embedding for the sound information may then be compared to each embedding of the set of speaker embeddings, and an active speaker may be determined based on the result of the comparison. This improved technique provides benefits relative to the foregoing technique, including by allowing for the identification of multiple potential speakers as an active speaker as opposed to a binary determination of whether a single speaker is the active speaker. This may be useful in, for example, a virtual meeting where the active speaker may be any participant in the meeting. An indication of the current active speaker may be presented to participants of the conversation, and therefore the participants may accurately identify the speaker to whom they are listening in real time or substantially real time. Alternatively, or in addition, a transcript or live captioning may be generated which accurately indicates the speaker of the transcribed or captioned words.

In some embodiments, audio data associated with a conversation is received by a user device, for example a personal device such as a smartphone, tablet, laptop, or personal computer. The audio data may be captured by the user device through a microphone. Alternatively, the audio data may be received from another device through the user device's network connection. The audio data may then be processed using a speaker identification model. The speaker identification model may be configured to generate an encoded representation of the audio and/or active speaker therein. Such an encoded representation may be referred to as an embedding.

As used herein, the term embedding is used in accordance with its normal and customary meaning in the art, and refers to a point or vector in an embedding space to which an audio signal or a feature-based representation of the audio signal may be mapped. For example, an embedding may be generated in the form of an n-dimensional vector, where n is the number of dimensions in the embedding space. Embeddings may be generated by a model (e.g., an artificial neural network or other deep learning model) trained to map audio or features extracted from audio into the embedding space. In the case of embeddings for speaker identification, the model may be referred to as a speaker identification model.

To identify an active speaker in audio data corresponding to a multi-participant conversation, a speaker identification system may generate an inference embedding of a portion of audio from the conversation (e.g., one or more frames of audio data) using a speaker identification model. This inference embedding of conversation audio in which an active speaker is to be identified may also be referred to as a conversation embedding. The speaker identification system may compare the conversation embedding to a set of speaker embeddings for speakers that may be identified as the active speaker. The speaker embeddings may be pre-generated (e.g., prior to the start of the conversation, or prior to generation of the conversation embedding) for the potential active speakers using the same model or a similar speaker identification model as is used for generating the conversation embedding. As a result of the comparison, a set of values, such as correlation values, indicating the most likely speaker among the set of known speaker embeddings may be generated. For example, a Euclidian distance or cosine similarity may be determined for each speaker embedding with respect to the conversation embedding. The speaker embedding that is closest to the conversation embedding based on the determined distances may be identified as the speaker embedding of the most likely active speaker.

In some embodiments, the speaker identification system may be a subsystem or module of a user computing system, such as user device. The speaker embeddings that the speaker identification system uses may be obtained (e.g., from a server) prior to commencement of the multi-participant conversation. For example, if a multi-participant conversation occurs as part of a scheduled meeting, then the speaker identification system may obtain a set of speaker embeddings including individual speaker embeddings for each expected participant identified in a roster for the scheduled meeting.

The user device may use results of the most likely active speaker determination to display, to the user or to a group of users, an indication of the most likely speaker. Alternatively, the user device may transmit the most likely speaker's identity to other devices connected to a communication system so that all users of the communication system may know the identity of the speaker. In some alternatives, a central server or server may receive data indicating the most likely speaker and the correlation values from multiple user devices, and may compare the various most likely speaker determinations from the individual devices in order to determine a single or set of the most likely speakers as the active speaker(s). The central server or servers may then inform the user devices of the communication system of the active speaker, enabling an accurate identification of the active speaker that is consistent across all devices participating in a multi-participant conversation.

In some embodiments, the speaker identification model may be trained, for example at a central server, and distributed to user devices of the communication system. Alternatively, a plurality of speaker identification models may be trained at a central server, and a speaker identification model determined to be suitable for each user device of the communication network may be transmitted to the user device. The most suitable speaker identification model for a device may be determined, for example, based on memory resources or processing resources available to the user device. Alternatively, the speaker identification model may be trained on the user device, for example to fine-tune the speaker identification model to identify a user who owns or is regularly associated with the user device. Alternatively, the speaker identification model may be trained on and remain on the server, where audio data from the user devices is transmitted to the server for processing. Alternatively, the speaker identification model may be fine-tuned at the server or user device based on an expected set of participants in a meeting or event for which the communication system implementing the active speaker identification system is to be used.

In some embodiments, the speaker embeddings are pre-generated and stored on a user device or on a server or set of servers. The speaker embeddings may be generated based on recorded audio data for which an identification has been made as to the speaker. Alternatively, the speaker embeddings may be generated by requesting a user of a user device to speak for a pre-determined period of time and then processing the user speech. Processing of the user speech may include generating false noise in the audio information to create a more useful speaker embedding of the speaker for use by the speaker identification model. Processing of the user speech may include removing noise or other audio information from the speech to create a more useful speaker embedding of the speaker for use by the speaker identification model.

In some embodiments, the identity of the most likely speaker is determined by a user device associated with a user. In some embodiments, the identity of the most likely speaker is determined by each of the user devices connected to the communication system. In alternative embodiments, the identity of the most likely speaker is determined by a central server or servers based on information received from the user devices capturing audio data and connected to the communication system. The user devices may individually process the audio data, for example, a correlation value for a speaker based on a comparison to a speaker embedding stored by the user device may be generated. The user device may then transmit the result of processing the audio data the user device has captured to the server or servers for further processing. Alternatively, the user devices may transmit the audio data directly to the server or servers for processing using a speaker identification model of the server.

As will be appreciated by one of skill in the art in light of the present disclosure, the embodiments disclosed herein improve the ability of computing systems to efficiently produce accurate output indicating an active speaker (or multiple active speakers) during multi-participant communication sessions. Moreover, the presently disclosed embodiments address technical problems inherent within computing systems; specifically, the single-user limitations under which many computing systems operate and the ability of computing systems to deal with dynamically-changing operating environments, communication session participant compositions, and the like. These technical problems are addressed by the various technical solutions described herein, including the application of set-based methods of active speaker identification using sets of encoded representations (e.g., speaker embeddings or other voiceprints) associated with possible speakers. Thus, the present disclosure represents an improvement to computing systems participating in or managing multi-participant communication sessions, and computing systems in general.

Various aspects of the disclosure will be described with regard to certain examples and embodiments, which are intended to illustrate but not limit the disclosure. Although aspects of some embodiments described in the disclosure will focus, for the purpose of illustration, on particular examples of machine learning models, speaker information, audio information, communication devices, user interfaces and the like, the examples are illustrative only and are not intended to be limiting. In some embodiments, the techniques described herein may be applied to additional or alternative types of machine learning models, speaker information, audio information, communication devices, user interfaces, and the like. Additionally, any feature used in any embodiment described herein may be used in any combination with any other feature or in any other embodiment, without limitation.

Example Speaker Identification System

With reference to an illustrative example, FIG. 1 shows an example active speaker identification system 100. The active speaker identification system 100 may comprise a plurality of communication devices 110A-110N located within a single physical location or otherwise in close proximity, a communication management system 120, one or more remote communication devices 130 located at a remote location 150 that is physically separated from the location of one or more communication devices 110A-110N, or some combination of these systems and devices.

In some embodiments, the communication management system 120 stores a plurality of speaker embeddings 112A-112N and a machine learning-based speaker identification model 122A. A speaker embedding 112A comprises information which may be used by a speaker identification module 114 to identify the active speaker 140, by comparison with an inference embedding (e.g., a conversation embedding generated from audio information related to a conversation) generated by a speaker identification model 122A. In some embodiments, the speaker embeddings may have been previously generated (e.g., by the communication management system) using the same speaker identification model 122A—or a copy thereof—used by the speaker identification module 114 to generate the inference embedding.

The speaker embedding 112A may be associated with a first user of the active speaker identification system 100, and a second speaker embedding 112B may be associated with a second user of the active speaker identification system 100. In this way, the speaker identification module 114 may identify individual users by each user's association with a speaker embedding. In alternative examples, the speaker identification module 114 may use speaker embedding 112A in conjunction with one or more of the remaining speaker embeddings of the plurality of speaker embeddings 112A-112N to identify the active speaker 140, for example where speaker embedding 112A and the second speaker embedding 112B represent the active speaker 140 in different noise environments. Using a set of speaker embeddings of the plurality of speaker embeddings 112A-112N to identify the same active speaker 140 may allow for more accurate identification when the noise environment of the single physical location of the communication device 110A changes.

In some embodiments, a communication device 110A comprises a sensor such as a microphone for detecting sound information, a network communication component, a memory for storing a speaker identification module 114 and a set of speaker embeddings 112A-112N, and a processing unit configured to execute instructions stored in the memory. The communication device 110A may optionally include a display used to indicate the identity of the active speaker 140. The communication device 110A may be a cellular device, such as a smartphone. In some embodiments, the communication device 110A may be a computing device, for example a laptop or a tablet computer. In some embodiments, the communication device 110A may be a telephonic system. The plurality of communication devices 110A-110N may comprise any combination of different communication devices (e.g., two smartphones and a laptop).

The speaker identification module 114 of the communication device 110A may perform the action of identifying the current speaker continuously for as long as the active speaker identification system 100 or the communication device 110A is active. The speaker identification module 114 may use a speaker identification model 122A and set of speaker embeddings 112A-112N received from the communication management system 120 to identify the active speaker 140. In some embodiments, the speaker identification model 122A used by the speaker identification module 114 of the communication device 110A may depend on the type of communication device 110A in which the speaker identification module 114 is included. Alternatively, the speaker identification model 122A of the speaker identification module 114 may depend on the available processing capacity of the communication device 110A. Alternatively, the speaker identification model 122A of the speaker identification module 114 may be selected by a user of the communication device 110A.

For example, where the second communication device 110B is a mobile computing device (e.g., a tablet computer) the second speaker identification model 122B used by the speaker identification module 114 may be designed for the more limited processing and memory resources available on the second communication device 110B. Alternatively, where the communication device 110A is a laptop computing device, the speaker identification model 122A of the speaker identification module 114 may be configured to utilize the greater memory and processing resources available as compared to the second communication device 110B.

In some embodiments, the communication device 110A may store a plurality of speaker embeddings (e.g., speaker embedding 112A and second speaker embedding 112B) used by the speaker identification module 114 to identify a single speaker. Alternatively, the communication device 110A may store a plurality of speaker embeddings (e.g., speaker embedding 112A and second speaker embedding 112B) used by the speaker identification module 114 to identify an associated plurality of speakers. In some examples, the communication device 110A may be associated with a user of the active speaker identification system 100. Alternatively, the communication device 110A may be associated with a plurality of users of the active speaker identification system 100. The association between the communication device 110A and at least one speaker using the active speaker identification system 100 may be used to select the set of speaker embeddings 112A-112N stored on the communication device 110A.

In some embodiments, the speaker identification module 114 of the communication device 110A may store a plurality of speaker identification models 122A-122N. For example, the speaker identification model 122A may be trained on a first set of training data comprising voice information for all speakers of the plurality of speaker embeddings 112A-112N, and a second speaker identification model 122B may have been trained on a subset of the plurality of speaker embeddings 112A-112N associated with a group of speakers expected to attend a meeting. The speaker identification module 114 may compare the inference embeddings generated by the speaker identification model 122A and the inference embeddings generated by the second speaker identification model 122B to the plurality of speaker embeddings 112A-112N to determine the active speaker 140 identity.

The plurality of speaker identification models 122A-122N may be trained to generate an embedding representing audio information (e.g., conversation audio information). For example, the speaker identification model 122A may be used to generate the plurality of speaker embeddings 112A-112N for a set of potential speakers, where the set of potential speakers are users of the active speaker identification system 100 (e.g., a group of individuals participating in a meeting conducted over the active speaker identification system 100). The speaker identification model 122A may additionally generate an embedding representing a window of audio information (e.g., audio information captured over a fixed timeframe) received by the communication device 110A. The window of audio information may be received by an audio detection device (e.g., a microphone) that is part of—or is in communication with—the communication device 110A. Alternatively, the window of audio information may be received by a network connection of the communication device 110A (e.g., audio information transmitted from the second communication device 110B to the communication management system 120, and from the communication management system 120 to the communication device 110A).

In some examples, the same speaker identification model 122A may be used to generate the plurality of speaker embeddings 112A-112N and the inference embeddings for windows of audio received during, for example, a meeting. In an alternative example, the speaker identification model 122A may generate the plurality of speaker embeddings 112A-112N, for example on the communication management system 120, and the second speaker identification model 122B may generate the inference embedding for a window of audio in the communication device 110A.

In some embodiments, the speaker identification model 122A may be designed to operate on a communication device 110A having a greater available processing power or memory than a second communication device 110B. The second speaker identification model 122B may be designed to operate within the limits of memory or processing available on the second communication device 110B. In such an embodiment, the speaker identification module 114 operating on the communication device 110A may use the same set of speaker embeddings 112A-112N as the speaker identification module 114 operating on the second communication device 110B. Alternatively, the speaker identification module 114 operating on the second communication device 110B may use a set of speaker embeddings generated using the second speaker identification model 122B. In this way, the comparison performed by the speaker identification module 114 between, for example, a conversation embedding generated by the second speaker identification model 122B and the set of embeddings stored by the speaker identification module 114 of the second communication device 110B may be more accurate.

In some embodiments, the speaker identification model 122A may be trained, for example at the communication management system 120, for an expected set of speakers. For example, a meeting invitation may be distributed to a set of users indicating a meeting is to be conducted using the active speaker identification system 100 (e.g., an audio-visual real-time conversation). The meeting invitation may indicate the identity of each expected participant—and therefore each expected speaker—for the meeting. An existing speaker identification model, for example speaker identification model 122A, may then be selected to be trained at the communication management system 120 on audio data associated with the expected speakers to create a narrowly trained conversation-specific version of the speaker identification model 122A. The conversation-specific speaker identification module 122A may then be used by the communication management system 120 to generate a conversation-specific set of speaker embeddings (e.g., speaker embeddings 112C-112L). The conversation-specific speaker identification model 122A, and the conversation-specific speaker embeddings may then be distributed by the communication management system 120 to the set of user devices (e.g., the set of user devices 110A-110N) associated with the expected speakers. The set of user devices associated with the expected speakers may then use the conversation-specific speaker identification model 122A to generate conversation embeddings and identify speakers during the meeting for which the meeting invitation was sent, resulting in more accurate identification of the active speaker 140.

In alternative embodiments, the speaker identification model 122A of the speaker identification module 114 on the communication device 110A may be trained further on the communication device 110A. For example, the speaker identification model 122A on the communication device 110A may undergo training on the communication device 110A using audio data associated with the expected speakers (e.g., the expected meeting participants listed in a meeting invitation or roster). Training the speaker identification model 122A on the communication device 110A may result in more accurate determination of the active speaker 140 by the speaker identification module 114 operating on the communication device 110A.

In the illustrated example, the communication management system 120 transmits, to the plurality of user devices 110A-110N, the plurality of speaker embeddings 112A-

112N, or a subset thereof, according to the expected speakers. In some embodiments, the expected speakers may be determined based on a speaker list accessible to the communication management system 120, for example a computerized meeting invitation. The communication management system 120 may then transmit a speaker embedding 112A associated with each speaker of the list to a communication device 110A associated with the speaker. Alternatively, where the communication device 110A is associated with one or more speakers, the set of speaker embeddings 112A-112N transmitted from the communication management system 120 to the communication device 110A may be determined based on the association. In some examples, when the communication device 110A connects to the communication management system 120, the communication management system 120 may determine the speaker embedding 112A is associated with a specific user and transmit to the communication device 110A a larger subset of the set of speaker embeddings 112A-112N representing the voice information of the specific user than is transmitted to the second communication device 110B not associated with the specific user.

In some embodiments, the communication management system 120 may also or exclusively comprise a speaker identification module 114. The speaker identification module 114 of the communication management system 120 may have access to the set of speaker identification models 122A-122N and the set of speaker embeddings 112A-112N stored on the communication management system 120. Alternatively, the speaker identification module 114 may be logically isolated from the set of speaker identification models 122A-122N and the set of speaker embeddings 112A-112N, and may instead receive one or more of the speaker identification models and one or more of the speaker embeddings. The speaker identification module 114 may receive audio information transmitted by the communication device 110A to the communication management system 120. The speaker identification module 114 of the communication management system 120 may then identify the active speaker. The identity of the active speaker may be transmitted from the speaker identification module 114 of the communication management system 120 to the communication device 110A, such as when the communication device 110A does not have the processing or memory necessary to run the speaker identification module 114. In another example, the speaker identification module 114 of the communication management system 120 identifies the active speaker based on audio information received from the set of communication devices 110A-110N and transmits the active speaker identity to the set of communication devices to ensure a uniform identification of the active speaker across all devices in communication with the communication management system 120. In a further example, the speaker identification module 114 of the communication management system 120 identifies the active speaker based on audio information received from a microphone that is physically separate from—and not in communication with—any of the communication devices 110A-110N.

In some embodiments, the communication device 110A may obtain a meeting invitation comprising a meeting participant list, the meeting participant list indicating the identity of individuals expected to attend a meeting. The communication device 110A may then request, from the communication management system 120, a set of speaker embeddings representing the individuals expected to attend the meeting.

In the illustrated example, the active speaker identification system 100 includes a remote communication device 130 which is not able to detect sound information associated with an active speaker 140. In some examples, the remote communication device 130 may be in a remote location 150 separate from the location of some or all of the plurality of communication devices 110A-110N (e.g., a different room within the same building as other users, a different city, etc.). The remote location 150 may alternatively be defined by being acoustically separated from the location of the active speaker 140, such that an acoustic sensor of the remote communication device 130 does not receive sufficient information to identify the active speaker 140 when the active speaker 140 is speaking. For example, the remote location 150 may be a location within a large conference room from which speech of the active speaker 140 is not detectable by the remote communication device 130.

In some embodiments, the remote communication device 130 does not contain a speaker identification module 114 or speaker embedding 112A, such as when a user of the active speaker identification system 100 is not a speaker. Where the active speaker 140 is located in the remote location 150 with the remote communication device 130, the remote communication device 130 may contain a speaker embedding 112C associated with the active speaker 140 in the remote location 150, and a speaker identification module 114.

In some embodiments, where there is more than one location at which an active speaker is located, a location may contain only a single potential speaker. When a location contains only one potential speaker, and one associated communication device (e.g., communication device 110C), the associated communication device may not contain a speaker identification module 114 or speaker embedding 112A. In such cases, when voice activity is detected in the location, the communication device 110A may identify, as an active speaker, the speaker associated with the communication device.

Example Continuous Speaker Identification Process

Figure 2:
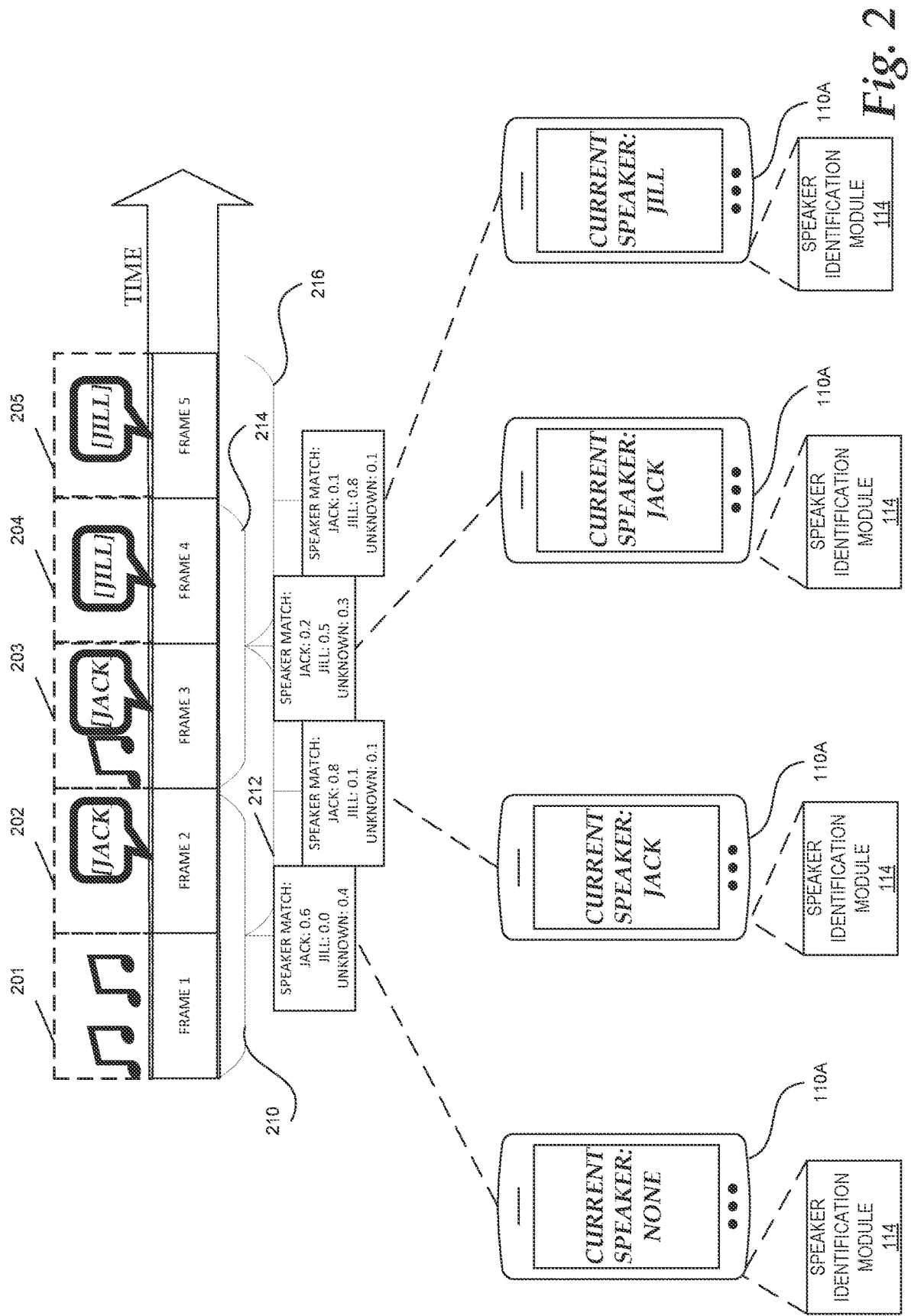
FIG. 2 is an illustrative timeline of continuous determination of an active speaker according to some embodiments.

FIG. 2 illustrates an example timeline of the process for speaker identification performed by the speaker identification module 114 of a communication device 110A to identify the active speaker 140 over a period of time.

In some embodiments, audio input to the communication device 110A may be divided into frames of audio. A frame of audio may be defined as a fixed interval of time (e.g., 1 second, 100 milliseconds, 5 milliseconds, etc.) for which audio information is received by the speaker identification module 114 of the communication device 110A. Where audio data is not received by the speaker identification module 114 at the same rate as frames are generated (e.g., three seconds of audio information are received by the speaker identification module 114 from the communication device 110A where a frame length is one second) the received audio data may be divided into frames for processing. The division of received audio into frames may be performed by any component of the communication device 110A, and the division of received audio into frames may be done prior to providing information to the speaker identification module 114, the speaker identification model 122A, or as part of the generating of an inference embedding by the speaker identification model 122A. In some implementations, the speaker identification module 114 may divide audio data into frames of different lengths, and in some implementations the audio data may not be divided into frames.

In the present illustrative example, the speaker identification module 114 receives audio data over time (e.g., conversation audio data), for example by a microphone of the communication device 110A. The received audio data is then divided into frames (e.g., by the speaker identification module 114), here a first frame 201 through a fifth frame 205. The frames of audio data are generated, in this example, in chronological order. In alternative examples, the frames of audio data may be received or generated out of chronological order and stored, for example, in a buffer until a set number of frames are received at which point the frames may be ordered for further processing. Additionally, while in this example the frames are generated from the received audio data by the speaker identification module 114, another component of the communication device 110A may generate frames of audio data. Alternatively, frames of audio data may be generated by another component of the active speaker identification system 100, for example the communication management system 120, and transmitted to the communication device 110A for further processing by the speaker identification module 114. In additional embodiments, the audio data may be received by a second communication device 110B of the active speaker identification system 100, and the audio data may then be transmitted by the receiving device to the communication management system 120 which may then transmit the audio data, in whole or as frames of audio data, to the communication device 110A. Alternatively, the audio data received by the second communication device 110B may be transmitted directly to the communication device 110A in whole or as frames of audio data.

At the beginning of the present illustrative example, the speaker identification module 114 generates the first frame 201 from the audio received by the communication device 110A, for example from the microphone of the communication device 110A. In this example, the first frame 201 comprises non-speech noise. In some implementations, the communication device 110A would not make a speaker determination were the first frame 201 to contain speaker information, because the speaker identification module 114 used by the communication device 110A may require, for example, at least two frames of audio data to make a speaker determination. In some embodiments, the speaker identification module 114 may require a speaker's likelihood of being the active speaker to exceed some threshold before the speaker identification module 114 will make an active speaker determination. The required number of frames on which a determination of an active speaker is made by the speaker identification module 114 of the communication device 110A is referred to as a window. In the present example, two frames are required to form a window, however in practice any number of frames may be required to form a window, depending upon the implementation.

Next, a second frame 202 is received by the communication device 110A as part of a first window 210. In this example, a window 210 has now been received by the communication device 110A, the window comprising the first frame 201 and the second frame 202. When audio information sufficient to form a first window 210 is received by the communication device 110A, the speaker identification module 114 may begin processing the first window 210 using the speaker identification model 122A stored in the communication device 110A or the speaker identification module 114. The processing of the first window 210 by the speaker identification module 114 comprises generating an inference embedding for the first window 210 using the speaker identification model 122A. The inference embedding may then be compared to the set of speaker embeddings 112A-112N stored in the speaker identification module 114.

The comparison may result in match data for each speaker associated with a speaker embedding, such as a set of values representing the similarity between the inference embedding and each of the set of speaker embeddings 112A-112N. For example, first match data for a first speaker may represent a cosine similarity value calculated to indicate the similarity of the inference embedding to the speaker embedding 112A, and second match data for a second speaker may represent a second cosine similarity value calculated to indicate the similarity between the inference embedding and the second speaker embedding 112B. In some examples, match data for each speaker may represent the cosine similarity values further processed to generate a speaker identity match rating, such as a probability that the speaker embedding corresponding to the speaker is the best match for the inference embedding. The speaker identity match rating values, in this example, for the first window 210 of the received audio compared to a first speaker embedding 112A representing "Jack" and a second embedding 112B representing "Jill" are shown in FIG. 2. Here, audio information not determined to be associated with either the speaker embedding 112A or the second embedding 112B is assigned to an "Unknown" grouping. The "Unknown" grouping may represent noise, speech, or any received audio which is not determined by the speaker identification module 114 to correlate to a speaker embedding among the set of speaker embeddings 112A-112N stored by the speaker identification module 114.

Additionally, even where, as in this example, a speaker is identified as having a highest speaker identity match rating, the communication device 110A may indicate the speaker is not known. In some implementations, to indicate a speaker is known the speaker identification module 114 may require that the same speaker be identified across a threshold quantity of windows. For example, the speaker identification module 114 may require a same speaker be identified in two consecutive windows, four consecutive windows, two windows indicating the same speaker separated by no more than two windows indicating a different speaker where each of the separating windows indicates a different speaker, or any other set of windows designed to assist in ensuring that a correct speaker is indicated by the communication device 110A. A requirement that a same speaker be determined as the active speaker 140 in a threshold quantity of consecutive windows additionally ensures that a single or small number of erroneous active speaker determinations, or a minor interruption to an active speaker by another speaker, do not result in confusing indications by the communication device 110A. For example, the indication of the active speaker 140 by the communication device 110A does not rotate so quickly that a user may not be able to identify any active speaker.

In the illustrated example, the communication device 110A then receives a third frame 203 of audio data, and can form a second window 212. The third frame 203 comprises both noise and speech information. The second window 212 is processed by the speaker identification model 122A of the speaker identification module 114 of the communication device 110A to generate a new inference embedding and a corresponding new set of speaker identity match rating values between the audio data of the second window 212 and the speaker embeddings stored in the communication device 110A. In the second window 212, the speaker embedding 112A associated with "Jack" is again the speaker embedding 112A with the highest speaker identity match rating. Therefore, the communication device 110A, having determined the speaker embedding 112A has the highest probability of being the active speaker 140 across two consecutive windows, the first window 210 and the second window 212, indicates "Jack" is the active speaker 140.

The communication device 110A then receives a fourth frame 204 of audio data, and can form a third window 214. The fourth frame 204 comprises speech information for "Jill." The third window 214 is processed by the speaker identification module 114 of the communication device 110A to generate another inference embedding and a new set of speaker identity match ratings is generated based on a comparison of the third window 214 to the speaker embedding 112A associated with "Jack" and the second speaker embedding 112B associated with "Jill". The speaker identification module 114 determines that there is some speech information of the third window 214 that correlates to the speaker embedding 112A and some that correlates to the second speaker embedding 112B as indicated by the updated speaker identity match rating values. In this example, the communication device 110A continues to indicate "Jack" is the active speaker, because "Jill" has only had the highest speaker identity match rating for one window, which in this example is less than the threshold quantity of consecutive windows required to trigger an active speaker determination. Alternatively, the communication device 110A could indicate that no speaker is active where a threshold quantity of windows (e.g., two consecutive windows) indicate different speaker embeddings have the highest speaker identity match rating. Alternatively, the communication device 110A may continue to indicate "Jack" as the active speaker where a threshold value for a speaker identity match rating must be satisfied to determine a speaker embedding with the highest probability of indicating the active speaker 140 (e.g., a speaker identity match rating below 0.6 may be considered by the speaker identification module 114 not to indicate an active speaker 140).

Finally, the communication device 110A receives the fifth frame 205 of audio data and can form a fourth window 216. The fifth frame 205 comprises speech information for "Jill." The fourth window 216 is processed by the speaker identification module 114 to generate a new inference embedding, and a new set of correlation values, for example cosine similarities between the set of speaker embeddings 112A-112N, is determined. The new cosine similarities are then used by the speaker identification module 114 to calculate a new speaker identity match rating for each speaker embedding. The speaker identity match ratings indicate, for the second consecutive window, that the second speech embedding 112B associated with "Jill" has the highest probability of indicating the active speaker 140. Now that two consecutive windows indicate the second speaker embedding 112B has the highest speaker identity match rating, the communication device 110A indicates that "Jill" is the active speaker.

Figure 3:
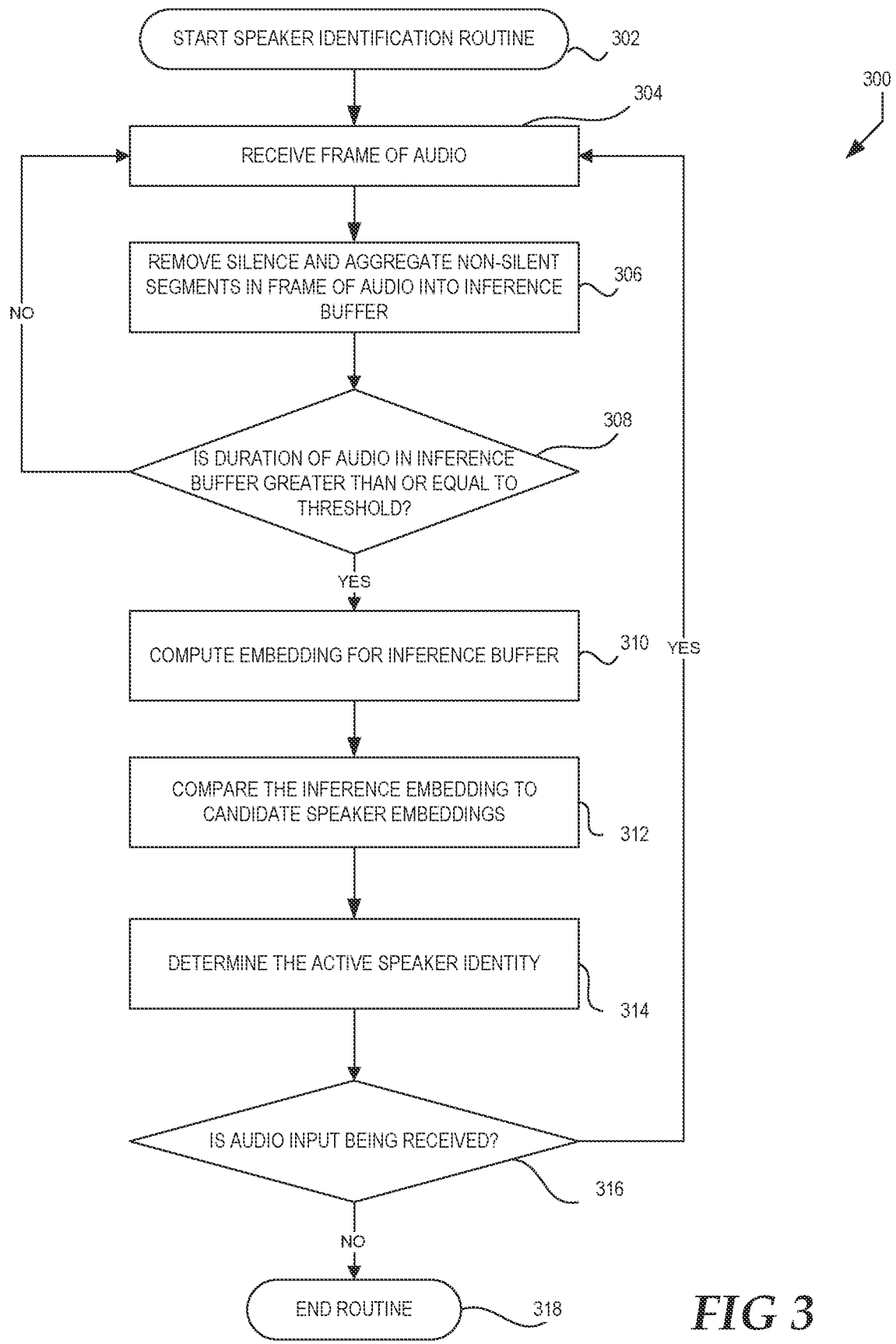
FIG. 3 is a flow diagram of an illustrative routine for determining an active speaker within received audio frames according to some embodiments.

FIG. 3 illustrates an example routine 300 for performing set-based active speaker identification with to identify an active speaker 140. Advantageously, a speaker identification module 114 operating on a communication device 110A, or a communication management system 120 may execute routine 300, or portions thereof, to train a speaker identification model 122A for a specific speaker, a specific group of speakers, a specific environment (e.g., a large convention hall, a single-worker office, a set of cubicles wherein a speaker is located in each cubicle, etc.), or for any other usage variable or combination of variables which may affect performance of the speaker identification model 122A. The routine 300 will be discussed herein in reference to operation on a communication device 110A to identify an active speaker, but may occur on any computing device operating as part of the active speaker identification system 100.

Routine 300 begins at block 302. In some embodiments, routine 300 begins in response to the opening of a communications application which may be in communication with the communication management system 120. Alternatively, routine 300 may begin in response to input of a user of the communication device 110A. Alternatively, routine 300 may begin in response to the start time of a meeting or other event for which start time information is stored on a device connected to the communication management system 120. Alternatively, routine 300 may begin in response to an acoustic sensor of the communication device 110A, such as a microphone, detecting sound. When the routine 300 begins, executable instructions may be loaded to or otherwise accessed in computer-readable memory and executed by one or more processors, such as the memory and processors of the communication device 110A described in greater detail below in reference to FIG. 5B.

At block 304, a frame of audio may be received by the communication device 110A. The frame of audio may be received by an acoustic sensor of the communication device 110A, such as a microphone. Alternatively, the frame of audio may be received from a sensor or other communication device in communication with the communication device 110A. When a frame of audio has been received by the communication device 110A, the routine 300 moves to block 306.

At block 306, silence may be removed from the received audio frame and non-silent segments of the audio frame are aggregated. The silence may be identified and removed by the speaker identification module 114 of the communication device 110A. Alternatively, another component of the communication device 110A may remove the silence from the received audio frame, for example a processor of the communication device 110A following instructions stored in a non-transitory machine-readable medium (e.g., memory of the device) in communication with the processor. Alternatively, the communication management system 120 may receive the received audio frame for processing. The communication management system 120 may remove the silence from the audio frame and aggregate the non-silent segments before transmitting the aggregate non-silent segments to the communication device 110A for further processing.

Once aggregated, the aggregated non-silent portions of the audio frame may then be stored in an inference buffer. The inference buffer may be a non-volatile memory (e.g., a hard disk drive, solid state drive, flash storage drive, etc.) or a volatile memory (e.g., random access memory) of the communication device 110A. Alternatively, where processing of the received audio frame is performed by the communication management system 120 (e.g., where the communication device 110A lacks sufficient processing resources to perform block 306) the inference buffer may be non-volatile or volatile memory of the communication management system 120. When non-silent portions of the received audio frame are aggregated in the inference buffer, the routine 300 moves to block 308.

At block 308, a determination may be made as to whether the duration of the audio stored in the inference buffer is greater than or equal to a threshold value. The threshold value may be a quantity of frames of sound information, or a number of seconds of audio contained in the sound information. The threshold duration may be fixed at a specific value for the entire active speaker identification system 100, may be fixed at a specific value for different components of the active speaker identification system 100

(e.g., a one-second buffer for the communication device 110A and a one-point-five second buffer for the second communication device 110B), or may be variable based on a condition recognized by the active speaker identification system 100 (e.g., the threshold duration may be shorter when speech begins in order to make an initial identification of the active speaker 140).

The threshold duration of block 308 may be determined for one or more of the communication devices of the active speaker identification system 100 based on any of a variety of factors. For example, the threshold duration may be determined prior to implementation of the active speaker identification system 100 based on a pre-determined optimal duration of speech required for accurate identification of an active speaker 140. Alternatively, the threshold duration may be determined by a component of the active speaker identification system 100, such as a communication device 110A, during operation of the active speaker identification system 100 based on a current condition of the environment (e.g., high environmental noise, multiple speakers detected in frames of audio, low input magnitude of audio information, etc.). Alternatively, the threshold duration may be determined by the communication management system 120 for an inference buffer of one or more communication devices 110A-110N, for example, based on a variable related to the individual communication device (e.g., available memory resources of the communication device 110A relative to second communication device 110B, a level of environmental noise received by the communication device 110A relative to the second communication device 110B, etc.).

The result of block 308 may be a determination that the duration of audio in the inference buffer is less than a threshold value, and the routine 300 will return to block 304 to continue receiving frames of audio. Alternatively, the result of block 308 may be that the duration of audio in the inference buffer is greater than or equal to the threshold value, and the routine 300 moves to block 310.

At block 310, an inference embedding (e.g., a conversation embedding) may be computed for the inference buffer. The inference embedding may be a sound embedding generated based on the sound information stored in the inference buffer. The inference embedding may be computed by a component of the communication device 110A, for example the speaker identification model 122A. Alternatively, the inference embedding may be computed by the communication management system 120, for example by any of the plurality of speaker identification models 122A-122N, and transmitted to one or more of the communication devices 110A-110N. In some examples, the inference embedding computed for the same information in the inference buffer may differ between different components of the active speaker identification system 100 (e.g., the inference embedding generated by the speaker identification model 122A of communication device 110A may differ from the inference embedding generated by the second speaker identification model 122B operating on the second communication device 110B for the same inference buffer information). When the inference embedding for the inference buffer has been computed the routine 300 moves to block 312.

At block 312, speaker identification module may evaluate the inference embedding with respect to each of a set of candidate speaker embeddings to generate match data. For example, the inference embedding may be compared to the candidate speaker embeddings 112A-112N to generate match data. As discussed above, the speaker embeddings 112A-112N may be stored by a memory of a communication device 110A. A speaker embedding 112A represents one of the candidate speakers of the set of candidate speakers who may be identified by the active speaker identification system 100. The inference embedding generated at block 310 may be compared to some or all of the speaker embeddings 112A-112N stored by the speaker identification module 114, the communication device 110A or the communication management system 120. The speaker identification module 114 may determine the set of candidate speaker embeddings to which the inference embedding generated at block 310 is to be compared, for example, based on a participant list of a virtual meeting invitation. Alternatively, the speaker identification module 114 may determine the set of candidate speaker embeddings to be used for comparison based on a hierarchy of sets of speaker embeddings, where the first level of the hierarchy comprises speaker embeddings associated with users who are the most likely to be the active speaker (e.g., users associated with a particular communication device, users who are listed in a meeting invitation, etc.), and the following levels comprise speaker embeddings associated with individuals of decreasing likelihood of being the active speaker (e.g., a superset of all potential speakers, of which the users listed in a meeting invitation are just one subset). When using such a hierarchy, the speaker identification module 114 may compare the inference embedding to the first set, and only compare the inference embedding to the following sets if no speaker embedding in the first set is determined to be associated with the active speaker. Alternatively, the speaker embeddings selected for comparison to the inference embedding may be chosen based on a user association with a communication device 110A, an indication by a user that a potential speaker is participating in a communication using the active speaker identification system 100, or by any other method through which a set of speaker embeddings may be selected. The result of comparing the inference embedding to the candidate speaker embeddings may be a set of cosine similarity values representing the similarity of a corresponding candidate speaker embedding and the inference embedding. The cosine similarity values may be further processed by the block 314 to generate a speaker identity match rating representing the probability each candidate speaker embedding represents the active speaker 140.

In alternative embodiments, the set of speaker embeddings 112A-112N may be further divided into a hierarchy of sets of speaker embeddings, such as when a set of meeting participants are expected to participate in a meeting based on a meeting participant list (as discussed in various examples above). In this example, a first set of speaker embeddings 112A-112F may represent the participants included in the meeting invitation, and a second set of speaker embeddings 112G-112N may represent all other speakers for whom speaker embeddings have been generated and stored. Continuing this example, the speaker identification module 114 may first compare the inference embedding to the first set of speaker embeddings 112A-112F. If no speaker embedding among the first set of speaker embeddings 112A-112F results in a determination of the active speaker 140, for example because the speaker identity match rating for each speaker embedding is below a threshold value, the speaker identification module 114 may then compare the inference embedding to the second set of speaker embeddings 112G-112N. In this way, the speaker identification module 114 may more efficiently identify the active speaker 140 when the active speaker is a meeting participant expected to participate in the meeting (e.g., the active speaker is identified on a meeting participant list) by not being required to perform a comparison between the inference embedding and the full set of speaker embeddings 112A-112N. The identification of the active speaker 140 by the speaker identification module 114 using a hierarchy of sets of speaker embeddings may additionally be more accurate, by limiting the number of similar speaker embeddings contained in a set. When the comparison of the inference embedding to the speaker embeddings 112A-112N has been completed, the routine 300 moves to block 314.

At block 314, the active speaker identity may be determined. The active speaker identity determination may be made by the communication device 110A. The communication device 110A may be associated with a single candidate speaker or a plurality of candidate speakers. The identity of the active speaker 140 may be determined based on the result of the comparison of the inference embedding to the candidate speaker embeddings performed in block 312. For example, the candidate speaker embedding with the highest speaker identity match rating when compared to the inference embedding may be determined to be the active speaker 140. Alternatively, a speaker likelihood threshold value may exist and any speaker embedding with a speaker identity match rating above the speaker likelihood threshold may be determined to identify an active speaker. Further, a speaker identity match rating failing to satisfy the speaker likelihood threshold would indicate the speaker associated with the speaker identity match rating is not the active speaker. In this way, more than one active speaker may be identified when more than one potential speaker is actively speaking at the same time, or the speaker identification module 114 may indicate that no active speaker can be identified (e.g., because of poor audio quality on the received audio data used to generate the inference embedding). Alternatively, where multiple speakers are determined to be the active speaker, the active speaker identification system 100 may determine there is no active speaker, for example where identifying a plurality of active speakers may be confusing to a user of the active speaker identification system 100.

Additionally, an active speaker determination based on a current result of the comparison in block 312 may be compared to one or more previous results of the comparison in block 312. An active speaker may be determined when the current result of the comparison in block 312 and one or more previous results of the comparison in block 312 result in an identification of the same active speaker. For example, when a same speaker embedding has the highest speaker identity match rating when compared to the inference embedding across two inference embeddings in a row, the speaker embedding may be used to identify the active speaker. Requiring the active speaker determination to remain consistent across more than one comparison to the inference embeddings may allow the speaker identification module 114 to avoid frequent or unnecessary changes to the identified active speaker, which may confuse a user of the active speaker identification system 100 or make the active speaker identification system 100 less useful. Additionally, requiring the active speaker determination to remain consistent across more than one comparison to the inference embedding may increase the accuracy of the active speaker determination by preventing a temporary false speaker identification from being displayed to a user of the active speaker identification system 100.

In some examples, the communication device 110A is associated with a specific user of the active speaker identification system 100. For example, a meeting invitation may be sent to a group of individuals, and a communication device 110A-110N may be associated individually with each of the individuals, or a subset of the individuals. The communication device 110A associated with a first individual may then perform routine 300 continuously to identify an active speaker 140. The communication device may be configured to only determine the active speaker when the speaker identity match rating comparison of block 312 indicates the active speaker is a user associated with the communication device 110A. Additionally, the communication device 110A may be configured to transmit the identity of the active speaker 140 to the communication management system 120 only when the active speaker 140 is the individual associated with the communication device 110A. The transmission of the identity of the active speaker may occur between block 314 and block 316. Additionally, the communication device 110A may be configured to only indicate, for example by a display of the communication device 110A, the identity of the active speaker 140 when the active speaker 140 is the first individual. When an active speaker 140 has been identified, the routine 300 moves to block 316.

At block 316, a determination is made as to whether audio is still being received by the active speaker identification system 100. The determination as to whether audio is still being receive may be made at the communication device 110A, the communication management system 120, or by any other component of the active speaker identification system 100. Alternatively, a user of the active speaker identification system 100 may indicate that no more audio will be received by the active speaker identification system 100. Alternatively, a meeting end time may be used to determine that no more audio will be received. When audio is still being received, or is still expected to be received based on the configuration of the active speaker identification system 100, the routine 300 returns to block 304. When audio is no longer being received by a component of the active speaker identification system 100 expected to receive audio, or when another indication is received by the active speaker identification system 100 that no more audio will be received, the routine 300 moves to block 318 and ends.

Example Information Display

Figure 4A:
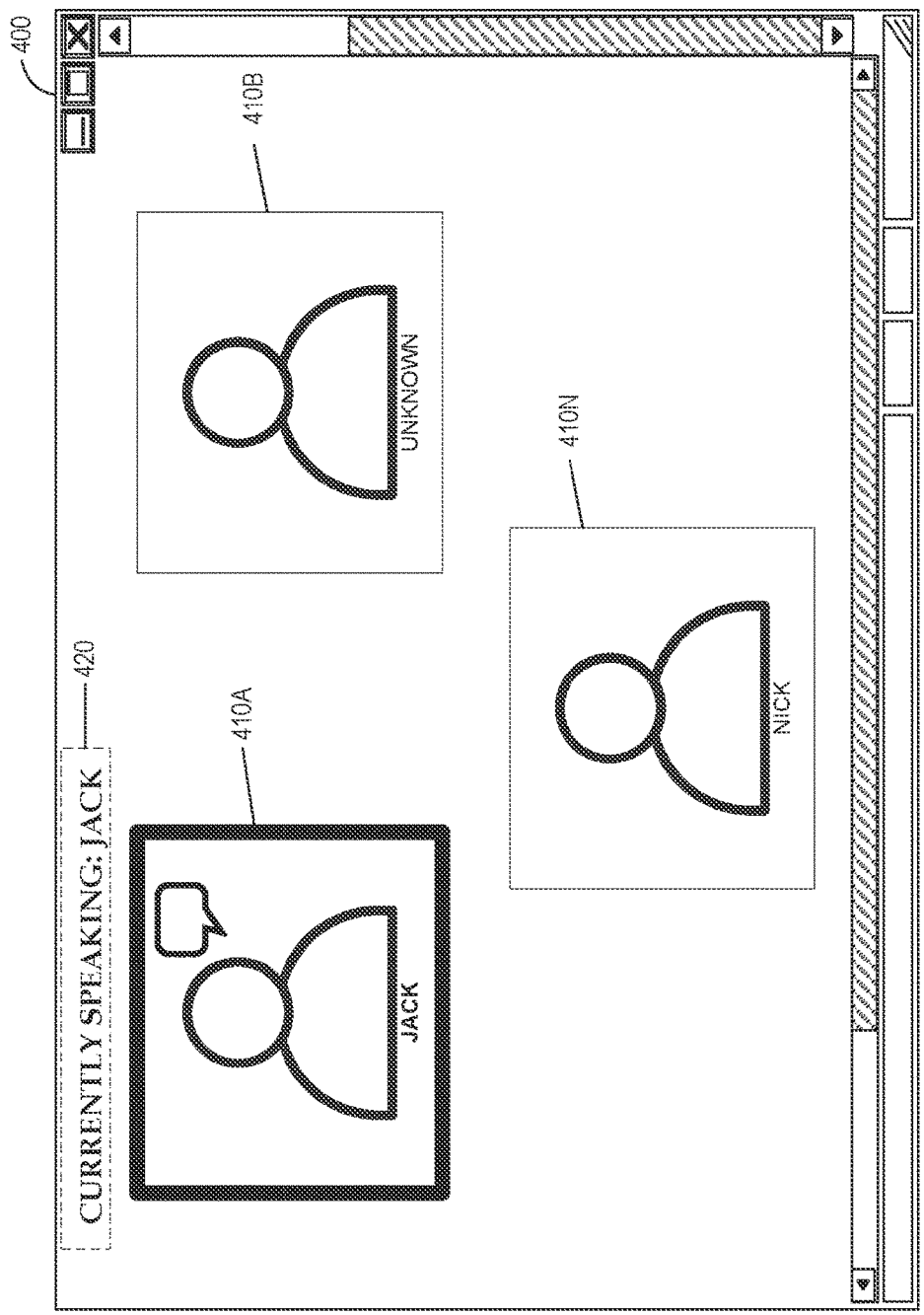
FIG. 4A is an illustrative example interface for a communications application utilizing an embodiment of set-based active speaker detection to display an active speaker identity where there is only one active speaker according to some embodiments.
Figure 4B:
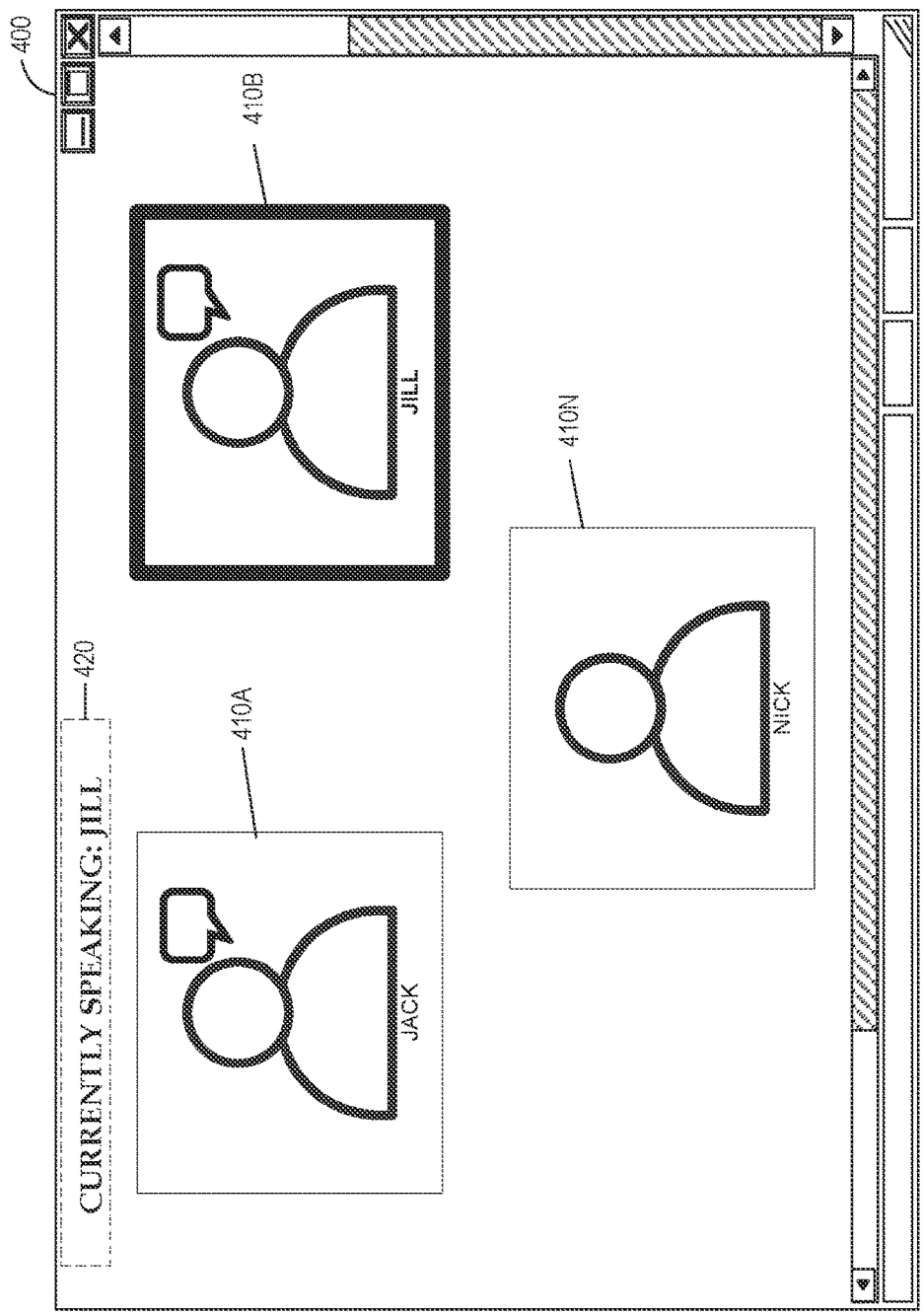
FIG. 4B is an illustrative example interface for a communications application utilizing an embodiment of set-based active speaker detection to display an active speaker identity where there is an unidentified active speaker according to some embodiments.

FIG. 4A illustrates an example user interface 400 of a communication system implementing the active speaker identification system 100 on a display of an example communication device 110A. Additionally, FIG. 4B illustrates the example user interface of FIG. 4A at a different point in time and will be discussed in conjunction with aspects of FIG. 4A. The user interface 400 is exemplary, and is not the only form a user interface 400 of the active speaker identification system 100 could take. Additionally, the user interface 400 may be presented in a form other than on a display, or the communication system may have no user interface 400. For example, the active speaker may be identified by audio speaking the name of the active speaker when requested, a display may contain only the information indicating the active speaker without a visual representation of the active speaker (e.g., when the speaker is not using a camera or has not provided a picture to the communication system for display), or the active speaker may be indicated by a color on a display.

The example user interface 400 comprises an indicator 420 indicating a current active speaker using the active speaker identification system 100, and a plurality of candidate speakers 410A-410N. As noted, the indicator 420 may be presented in a form other than text indicating the name of the active speaker. Additionally, the active speaker may be identified based on a location, or other information which a user of the communication system may associate with an active speaker. In this example, the active speaker 410A has a thicker bounding box to assist in identification of the active speaker 410A for other users viewing the user interface 400. Alternatively, the active speaker 410A may have a different color icon, different color bounding box, a different visual indicator associated with the active speaker 410A, or no visual indication that the active speaker 410A is speaking.

The additional users of the user interface 400, unknown candidate speaker 410B and candidate speaker 410N, may be viewing the same user interface 400. Alternatively, the user interface 400 may appear differently to a user depending on the type of communication device being used. For example, active speaker 410A may be using a laptop computing device as his communication device 110A, and may see the example user interface 400 presented here. Continuing this example, unknown candidate speaker 410B may be using a smartphone as their communication device 110B, and may see a compact or altered version of the user interface 400 designed to adapt to the communication device 110B having a smaller display area than the communication device 110A.

In this example, the unknown candidate speaker 410B and candidate speaker 410N are displayed with a bounding box that is not as thick as the bounding box surrounding the active speaker 410A. Alternatively, the bounding box around unknown candidate speaker 410B and candidate speaker 410N may be the same as the bounding box around active speaker 410A. In this alternative, the determination that the unknown candidate speaker 410B and the candidate speaker 410N are not active speakers may be indicated in the user interface 400 by another method, for example by a different color background or a symbol placed over the unknown candidate speaker 410B and the candidate speaker 410N.

Referring now to FIG. 4B, the user interface 400 has been updated to indicate that two speakers are speaking, the active speaker 410A and the unknown candidate speaker 410B of FIG. 4A. Here, the unknown candidate speaker 410B has spoken, and the active speaker identification system 100 has determined the identity of the unknown candidate speaker 410B, for example by following the routine 300. In response to the identification of the unknown candidate speaker 410B, the user interface 400 now displays a name within the bounding box around the unknown candidate speaker 410B indicating her name. Additionally, the bounding box around the previously unknown candidate speaker 410B has been changed, and the indicator 420 has been updated to indicate that the previously unknown candidate speaker 410B is now the active speaker.

In this example, the previous active speaker 410A, continues to make noise, but is no longer indicated by the user interface 400 as speaking. This may occur for several reasons. For example, the active speaker 410A of FIG. 4A may have a reduced speaking volume at the time of FIG. 4B, wherein the volume of speech of active speaker 410A is below a threshold used to determine individuals to be indicated as speaking in the user interface 400 by the active speaker identification system 100. Alternatively, at the time of FIG. 4B, the previous active speaker 410A may have made a non-speech noise, such as coughing, and been determined by the speaker identification module 114 of the communication device 110A being used by the previous active speaker 410A to not be speaking.

Execution Environment

Figure 5A:
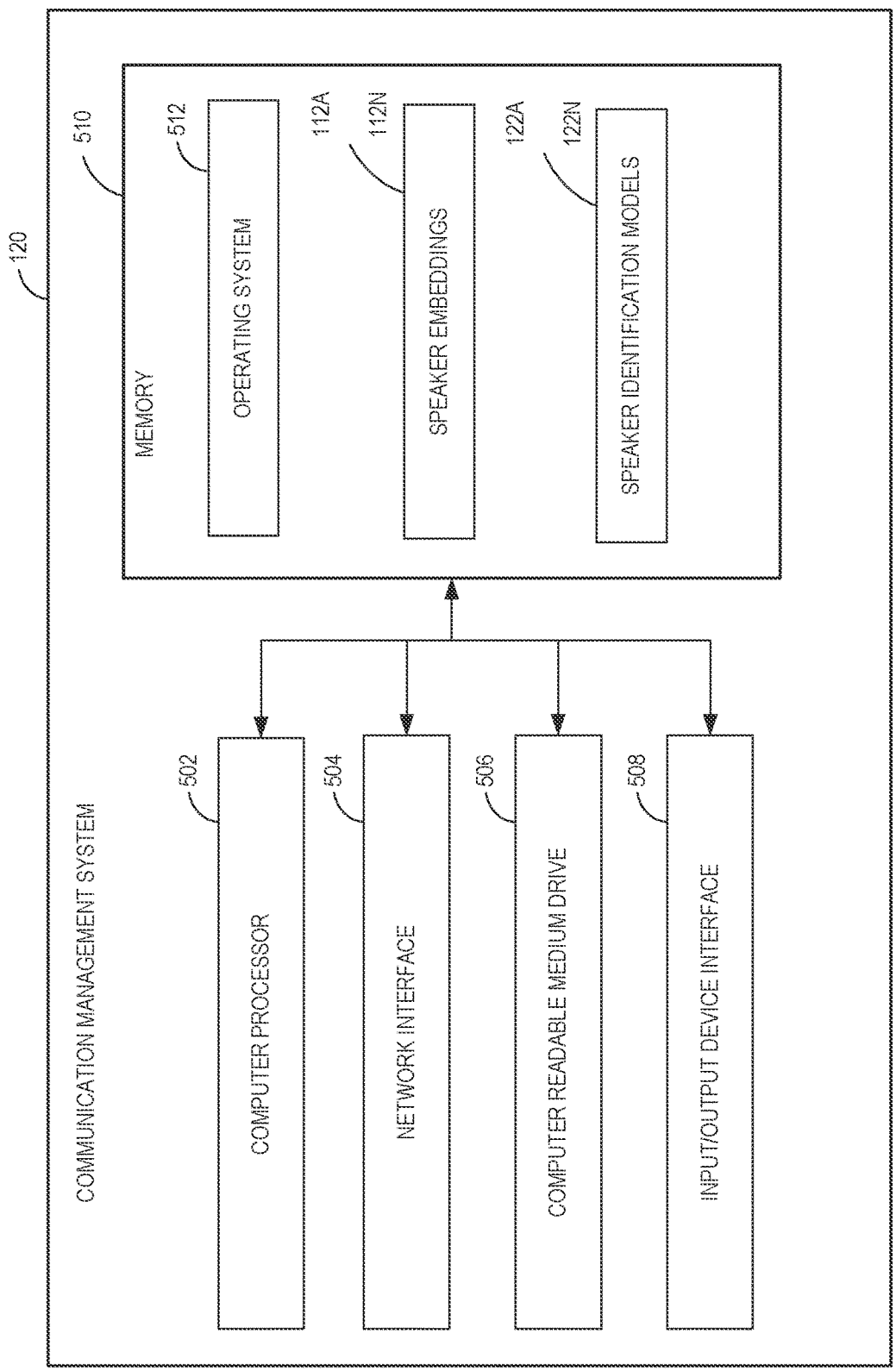
FIG. 5A is a block diagram of an illustrative communication management system configured to implement aspects of the present disclosure according to some embodiments.

FIG. 5A illustrates various components of an example communication management system 120 configured to implement the various functionality described herein.

In some embodiments, the communication management system 120 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the communication management system 120 may be implemented as web services consumable via one or more communication networks. In further embodiments, the communication management system 120 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a communication management system 120 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces; one or more input/output device interfaces 508, such as display, a speaker, a microphone, a camera, and/or other components configured to allow the input or output of information; and one or more computer-readable memories 510, such as random access memory ("RAM") and/or other volatile non-transitory computer readable media.

The computer-readable memory 510 may include computer program instructions that one or more computer processors 502 execute and/or data that the one or more computer processors 502 use in order to implement one or more embodiments. For example, the computer-readable memory 510 can store an operating system 512 to provide general administration of the communication management system 120. As another example, the computer-readable memory 510 may store a plurality of speaker embeddings 112A-112N representing individual known speakers. The plurality of speaker embeddings 112A-112N may be a fixed set provided to the communication management system 120, for example by a user. Alternatively, the plurality of speaker embeddings 112A-112N may be of variable size, with individual speaker embeddings being added or removed during the operation of the communication management system 120. For example, when an unknown speaker begins speaking into a communication device 110A of the active speaker identification system 100, the speaker identification model 122A active on the communication device 110A, or on the communication management system 120, may determine the unknown speaker is not included within the plurality of speaker embeddings 112A-112N and generate a new speaker embedding 112M to represent the unknown speaker. The new speaker embedding 112M may then be assigned to an individual.

As another example, the computer-readable memory 510 may store a plurality of speaker identification models 112A-122N. The plurality of speaker identification models 112A-122N may be of fixed size, for example where a user of the communication management system 120 provides the plurality of speaker identification models 112A-122N to be used. Alternatively, the plurality of speaker identification models 112A-122N may be of variable size. For example, the communication management system 120 may receive information related to a meeting using the active speaker identification system 100, the information including identities of expected participants in the meeting. The communication management system 120 may then select a selected speaker identification model 122C of the plurality of speaker identification models 112A-122N for the meeting, based on the information received by the communication management system 120. The communication management system 120 may then, in this example, instruct the one or more computer processors 502 to perform fine-tuning or further training of the selected speaker identification model 122C to allow the selected speaker identification model 122C to better identify the expected meeting participants. The fine-tuned or further trained version of the selected speaker identification model 122C may then be stored with the plurality of speaker identification models 112A-122N in the computer-readable memory 510 for future use.

Figure 5B:
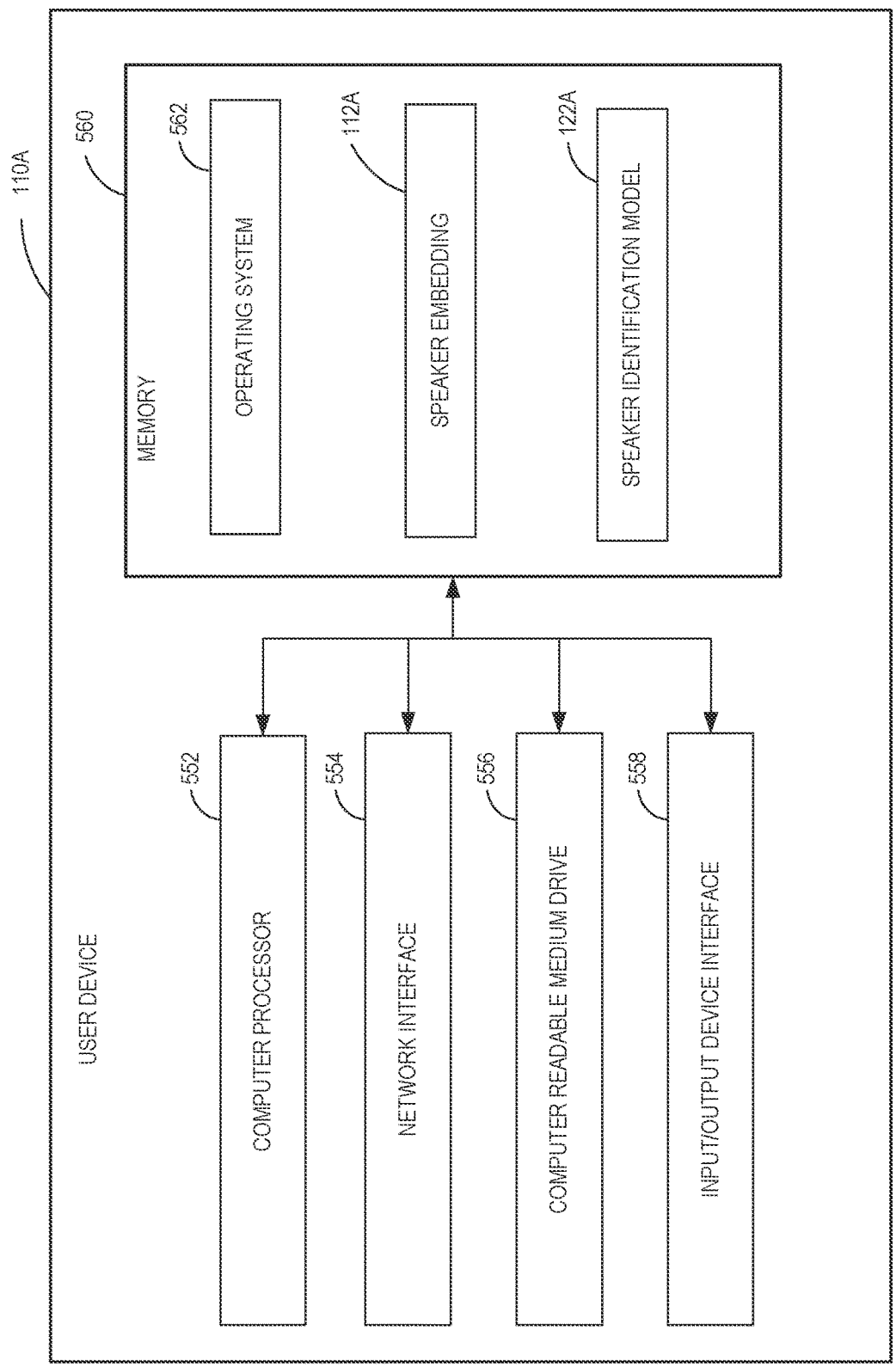
FIG. 5B is a block diagram of an illustrative user device configured to implement aspects of the present disclosure according to some embodiments.

FIG. 5B illustrates various components of an example communication device 110A configured to implement the various functionality described herein.

In some embodiments, the communication device 110A may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the communication device 110A may be implemented as web services consumable via one or more communication networks. In further embodiments, the communication device 110A is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

In some embodiments, as shown, a communication device 110A may include: one or more computer processors 552, such as physical central processing units ("CPUs"); one or more network interfaces 554, such as a network interface cards ("NICs"); one or more computer readable medium drives 556, such as a high density disk ("HDDs"), solid state drives ("SSDs"), flash drives, and/or other persistent non-transitory computer readable media; one or more input/output device interfaces 558, such as a display, a speaker, a microphone, a camera, and/or other components configured to allow the input or output of information; and one or more computer-readable memories 560, such as random access memory ("RAM") and/or other volatile non-transitory computer readable media.

The computer-readable memory 560 may include computer program instructions that one or more computer processors 552 execute and/or data that the one or more computer processors 552 use in order to implement one or more embodiments. For example, the computer-readable memory 560 can store an operating system 562 to provide general administration of the communication device 110A. As another example, the computer-readable memory 560 may store at least one speaker embedding 112A representing a speaker. The speaker embedding 112A may be associated with a user or owner of the communication device 110A. In some examples, the speaker embedding 112A is received from the communication management system 120 by the one or more network interfaces 554 based on the owner or user of the communication device 110A. In other examples, the speaker embedding 112A may be stored in the computer-readable memory 560 of the communication device 110A for as long as a user owns or controls the communication device 110A (e.g., until the communication device 110A is transferred to another user).

As another example, the computer-readable memory 560 may store a speaker identification model 122A. The speaker identification model 122A may be received from the communication management system 120 by the one or more network interfaces 554 of the communication device 110A and selected from the plurality of speaker identification models 122A-122N stored in the computer-readable memory 510. Alternatively, the speaker identification model 122A may be stored in the computer-readable memory 560 of the communication device 110A when a communication application is installed on the device by the user. The speaker identification model 122A stored in the computer-readable memory 560 may differ from a second speaker identification model 122B that would be used by a second communication device 110B. The selection of the speaker identification model 122A for the communication device 110A may be based on the available computer-readable memory 560 of the communication device 110A. Alternatively, the speaker identification model 122A stored in the computer-readable memory 560 of the communication device 110A may be selected based on the available processing resources of the one or more computer processors 552 of the communication device 110A. Additionally, the speaker identification model 122A or another component stored in the computer-readable memory 560 of the communication device 110A may contain instructions for the one or more computer processors 552 to fine tune or conduct further training of the speaker identification model 122A. For example, where the communication device 110A is associated with a user, the one or more computer processors 552 may be instructed to train the speaker identification model 122A in order to better identify the user of the communication device 110A.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a server comprising computer-readable memory and one or more processors configured to:
      determine, from a plurality of candidate speaker embeddings, a first set of speaker embeddings associated with a first level of a hierarchy associated with a meeting participant list, and a second set of speaker embeddings associated with a second level of the hierarchy, wherein a speaker embedding comprises voice information of an individual speaker;
transmit the first set of speaker embeddings;
transmit the second set of speaker embeddings;
a first computing device comprising:
a first microphone configured to generate first sound information representing a sound of a location; and
computer-readable memory and one or more processors configured to:
receive the first set of speaker embeddings, from the server;
receive the second set of speaker embeddings, from the server;
receive the first sound information from the first microphone;
generate a first inference embedding for the first sound information;
determine the first level of the hierarchy indicates speakers associated with the first set of speaker embeddings are more likely to be an active speaker than speakers associated with the second set of speaker embeddings;
compare the first inference embedding to the first set of speaker embeddings to generate a first result;
determine, based on the first result, a first active speaker identity; and
generate a first user interface update based on the first active speaker identity;
a second computing device comprising:
a second microphone configured to generate second sound information representing the sound of the location; and
computer-readable memory and one or more processors configured to:
receive the first set of speaker embeddings from the server;
receive the second set of speaker embeddings, from the server;
receive the second sound information from the second microphone;
compute a second inference embedding for the second sound information;
determine the first level of the hierarchy indicates speakers associated with the first set of speaker embeddings are more likely to be an active speaker than speakers associated with the second set of speaker embeddings;
compare the second inference embedding to the first set of speaker embeddings to generate a second result;
determine, based on the second result, a second active speaker identity; and
generate a second user interface update based on the second active speaker identity.

2. The system of claim 1, the server comprising computer-readable memory and one or more processors further configured to:
select, from a set of speaker embeddings, a second set of speaker embeddings based in part on a first user associated with the first computing device;
select, from a set of speaker embeddings, a third set of speaker embeddings based in part on a second user associated with the second computing device;
transmit, to the first computing device, the second set of speaker embeddings; and
transmit, to the second computing device, the third set of speaker embeddings.

3. A system comprising:
a sensor configured to generate sound information representing a sound; and
computer-readable memory and one or more processors, wherein the one or more processors are configured to:
receive a first speaker embedding representing a voice of a first speaker, wherein the first speaker embedding is associated with a first level of a hierarchy of speaker embeddings;
receive a second speaker embedding representing a voice of a second speaker, wherein the second speaker embedding is associated with a second level of the hierarchy of speaker embeddings;
receive, from the sensor, the sound information;
generate a sound embedding based on the sound information;
evaluate the sound embedding with respect to the first speaker embedding to generate first match data prior to evaluating the sound embedding with respect to the second speaker embedding when the first level of the hierarchy indicates the first speaker is more likely to be an active speaker than the second speaker;
compare the first match data to a threshold to determine the first match data does not exceed the threshold;
based on the first match data not exceeding the threshold, evaluate the sound embedding with respect to the second speaker embedding to generate second match data; and
determine one of the first speaker or the second speaker as the active speaker based on the first match data and the second match data.

4. The system of claim 3, wherein the one or more processors are further configured to:
compare the first match data to the second match data; and
determine the first speaker is the active speaker based on a value of the first match data being greater than a value of the second match data.

5. The system of claim 3, wherein the one or more processors are further configured to:
receive, from the sensor, second sound information;
generate a second sound embedding based on the second sound information;
evaluate the second sound embedding with respect to the first speaker embedding to generate third match data;
evaluate the second sound embedding with respect to the second speaker embedding to generate fourth match data; and
determine, based on the third match data failing to satisfy a threshold value and the fourth match data failing to satisfy the threshold value, that the active speaker is unknown.

6. The system of claim 5, wherein the one or more processors are further configured to:
determine voice information based on the second sound information; and
generate a third speaker embedding based on the voice information.

7. The system of claim 3, wherein a plurality of speaker embeddings, including the first speaker embedding and the second speaker embedding, are received prior to a scheduled meeting, wherein the scheduled meeting is associated with a plurality of speakers including the first speaker and the second speaker, and wherein each speaker of the plurality of speakers is associated with a different speaker embedding of the plurality of speaker embeddings.

8. The system of claim 3, where to generate the sound embedding based on the sound information, the one or more processors are configured to generate the sound embedding using a machine learning-based speaker identification model to process the sound information.

9. The system of claim 8, wherein the first speaker embedding and the second speaker embedding are received from a server, and wherein the first speaker embedding and the second speaker embedding are generated by the server using a copy of the machine learning-based speaker identification model.

10. The system of claim 8, wherein the one or more processors are further configured to:
receive first speaker voice information associated with the first speaker;
receive second speaker voice information associated with the second speaker; and
prior to receipt of the sound information from the sensor, train the machine learning-based speaker identification model using the first speaker voice information and the second speaker voice information.

11. The system of claim 10, wherein the one or more processors are further configured to:
following training of the machine learning-based speaker identification model using the first speaker voice information and the second speaker voice information, generate, by the machine learning-based speaker identification model, a third speaker embedding associated with the first speaker and a fourth speaker embedding associated with the second speaker.

12. The system of claim 3, wherein to the one or more processors are further configured to:
determine that a threshold quantity of frames of sound information within a window of time have been received from the sensor; and
determine, based on the threshold quantity of frames being received, to generate the sound embedding.

13. The system of claim 3, wherein the one or more processors are further configured to determine that the first speaker has been identified as the active speaker for a threshold quantity of frames of sound information.

14. The system of claim 3 further comprising a display, wherein the one or more processors are further configured to cause presentation of an active speaker indicated in response to determining one of the first speaker or the second speaker as the active speaker.

15. A computer-implemented method comprising:
as implemented by a computing device comprising one or more processors configured to execute specific instructions,
receiving a set of speaker embeddings comprising a first subset of speaker embeddings associated with a first level of a hierarchy, and a second subset of speaker embeddings associated with a second level of the hierarchy;
receiving sound information generated by a microphone of the computing device;
generating an inference embedding based on the sound information;
evaluating the inference embedding with respect to the first subset of speaker embeddings when the first level of the hierarchy indicates speakers associated with the first subset of speaker embeddings are more likely to be an active speaker than speakers associated with the second subset of speaker embeddings;
evaluating the inference embedding with respect to a first speaker embedding of the first subset of speaker embeddings to generate first match data, wherein the first speaker embedding is associated with a first speaker of a set of speakers associated with the first level of the hierarchy;
evaluate the inference embedding with respect to a second speaker embedding of the first subset of speaker embeddings to generate second match data, wherein the second speaker embedding is associated with a second speaker of the set of speakers associated with the first level of the hierarchy;
determining one of the first speaker or the second speaker as an active speaker based on the first match data and the second match data; and
updating a user interface update according to the determining of the active speaker.

16. The computer-implemented method of claim 15, wherein the set of speaker embeddings are received based on a set of speakers associated with the computing device.

17. The computer-implemented method of claim 15, further comprising:
receiving, from the microphone, second sound information;
generating a second inference embedding based on the sound information;
evaluating the second inference embedding with respect to the first speaker embedding to generate third match data;
evaluating the second inference embedding with respect to the second speaker embedding to generate fourth match data; and
determining that neither the third match data or the fourth match data satisfy a threshold.

18. The computer-implemented method of claim 17, further comprising:
receiving a second set of speaker embeddings wherein the second set of speaker embeddings is associated with a third level of the hierarchy of speaker embeddings;
evaluating the second inference embedding with respect to a fifth speaker embedding of the second set of speaker embeddings to generate fifth match data, wherein the fifth speaker embedding is associated with a fifth speaker of a second set of speakers;
determining the fifth speaker is the active speaker based on the fifth match data satisfying the threshold; and
updating the user interface update based on fifth speaker being determined to be the active speaker.

19. The computer-implemented method of claim 15, further comprising:
generating a new speaker embedding based on the inference embedding; and
adding the new speaker embedding to the set of speaker embeddings.

20. The computer-implemented method of claim 15, further comprising:
determining a candidate set of speaker embeddings from the set of speaker embeddings, wherein candidate set includes the first speaker embedding and the second speaker embedding.

* * * * *